United States Patent
Jennings

(10) Patent No.: US 11,893,120 B1
(45) Date of Patent: Feb. 6, 2024

(54) APPARATUS AND METHOD FOR EFFICIENT VULNERABILITY DETECTION IN DEPENDENCY TREES

(71) Applicant: SOOS LLC, Winooski, VT (US)

(72) Inventor: Joshua Holden Jennings, South Royalton, VT (US)

(73) Assignee: SOOS LLC

( * ) Notice: Subject to any disclaimer, the term of this patent is extended or adjusted under 35 U.S.C. 154(b) by 0 days.

(21) Appl. No.: 17/940,188

(22) Filed: Sep. 8, 2022

(51) Int. Cl.
G06F 21/57 (2013.01)
G06F 8/71 (2018.01)
G06F 8/41 (2018.01)

(52) U.S. Cl.
CPC ............ G06F 21/577 (2013.01); G06F 8/433 (2013.01); G06F 8/71 (2013.01)

(58) Field of Classification Search
CPC ........... G06F 21/577; G06F 8/433; G06F 8/71
See application file for complete search history.

(56) References Cited

U.S. PATENT DOCUMENTS

| | | | |
|---|---|---|---|
| 10,635,423 B2 | 4/2020 | Newell | |
| 10,909,109 B1* | 2/2021 | Kambhampati | G06F 9/466 |
| 11,481,245 B1* | 10/2022 | Oliver | G06F 8/41 |
| 11,550,903 B1* | 1/2023 | Epstein | G06F 21/577 |
| 11,558,414 B1* | 1/2023 | Nguyen | H04L 63/1433 |
| 11,586,436 B1* | 2/2023 | Jennings | G06F 8/71 |
| 11,609,985 B1* | 3/2023 | Shemesh | G06F 21/51 |
| 2004/0249830 A1* | 12/2004 | Sonkin | G06F 9/45512 |
| 2008/0201705 A1 | 8/2008 | Wookey | |
| 2009/0083732 A1* | 3/2009 | Shen | G06F 8/20 717/177 |
| 2015/0268948 A1* | 9/2015 | Plate | G06F 21/577 717/123 |
| 2019/0205479 A1* | 7/2019 | Zizka | G06F 8/751 |
| 2019/0228269 A1* | 7/2019 | Brent | G06V 10/82 |
| 2020/0272556 A1 | 8/2020 | Podjarny | |
| 2021/0365308 A1 | 11/2021 | Myneni | |
| 2022/0083667 A1* | 3/2022 | Anwar | G06F 21/577 |
| 2022/0107917 A1 | 4/2022 | Melnik | |
| 2022/0179627 A1* | 6/2022 | Bagadia | G06F 8/433 |
| 2022/0222351 A1* | 7/2022 | Levin | G06F 21/577 |
| 2022/0303295 A1* | 9/2022 | Erlingsson | G06F 16/9038 |
| 2022/0309162 A1* | 9/2022 | Purushothaman | G06F 8/62 |
| 2022/0309163 A1* | 9/2022 | Purushothaman | G06F 21/31 |
| 2022/0311794 A1* | 9/2022 | Maya | G06F 11/3065 |
| 2022/0318396 A1* | 10/2022 | Deng | G06F 21/577 |
| 2022/0321594 A1* | 10/2022 | Formicola | H04L 63/1425 |
| 2022/0329616 A1* | 10/2022 | O'Hearn | H04L 63/10 |
| 2022/0382530 A1* | 12/2022 | Roy | H04L 67/34 |

(Continued)

*Primary Examiner* — Stephen T Gundry
(74) *Attorney, Agent, or Firm* — Caldwell Intellectual Property Law

(57) ABSTRACT

An apparatus for scanning vulnerabilities, wherein the apparatus includes at least a processor and a memory communicatively connected to the at least a processor, the memory containing instructions configuring the at least a processor to access at least a manifest file, wherein the at least manifest file includes at least a direct dependency, scan the manifest file for a software package data, extract the software package data from the manifest file, generate at least a dependency tree as a function of the software package data, and store the dependency tree in a database. A method for scanning vulnerabilities is also disclosed.

18 Claims, 7 Drawing Sheets

(56) References Cited

U.S. PATENT DOCUMENTS

| | | | |
|---|---|---|---|
| 2022/0382882 A1* | 12/2022 | Gokhman | G06F 8/75 |
| 2022/0391541 A1* | 12/2022 | Novotny | G06F 8/41 |
| 2022/0414213 A1* | 12/2022 | Dixit | G06F 21/554 |
| 2023/0019837 A1* | 1/2023 | Jennings | G06F 21/566 |
| 2023/0027810 A1* | 1/2023 | Pokorny | G06F 8/71 |
| 2023/0059494 A1* | 2/2023 | Hunter | G06F 40/279 |
| 2023/0061121 A1* | 3/2023 | Tosevska | A61K 31/12 |
| 2023/0075355 A1* | 3/2023 | Twigg | G06F 16/9537 |
| 2023/0083195 A1* | 3/2023 | Yang | G06F 8/63 726/25 |
| 2023/0094735 A1* | 3/2023 | Krasnov | H04L 63/166 726/23 |

\* cited by examiner

US 11,893,120 B1

APPARATUS AND METHOD FOR EFFICIENT VULNERABILITY DETECTION IN DEPENDENCY TREES

FIELD OF THE INVENTION

The present invention generally relates to the field of cybersecurity. In particular, the present invention is directed to a system and method for scanning vulnerability.

BACKGROUND

Most open-source software is installed via a manifest file. When detecting vulnerabilities, a manifest file may be examined against a list of know vulnerable packages. Existing solutions are not efficient enough when manifest file contains many packages, and these packages further depends on many other packages, and so on.

SUMMARY OF THE DISCLOSURE

In an aspect, an apparatus for scanning vulnerabilities, wherein the apparatus includes at least a processor and a memory communicatively connected to the at least a processor, the memory containing instructions configuring the at least a processor to: access at least a manifest file, wherein the at least manifest file includes at least a direct dependency, scan the manifest file for a software package data, extract the software package data from the manifest file, generate at least a dependency tree as a function of the software package data, and store the dependency tree in a database.

In another aspect, a method for scanning vulnerabilities, wherein the method includes accessing, using at least a processor, at least a manifest file, wherein the at least manifest file includes at least a direct dependency, scanning, using the at least a processor, the manifest file for a software package data, extracting, using the at least a processor, the software package data from the manifest file, generating, using the at least a processor, at least a dependency tree as a function of the software package data, and storing, using the at least a processor, the dependency tree in a database.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for scanning vulnerabilities, wherein this disclosure may include a computing device. The present disclosure access at least a manifest file, wherein the at least manifest file includes at least a direct dependency. In some embodiments, at least a direct dependency may include one or more transitive dependencies. This disclosure scans the manifest file for a software package data, wherein software package data may further include a software package identifier. Present disclosure further extracts the software package data from the manifest file. In some embodiment, extracting the software package data from the manifest file may using a multi-threaded algorithm. Aspects of the present disclosure can generate at least a dependency tree as a function of the software package data. Aspects of the present disclosure also allow for storing the dependency tree in a database.

Figure 1:
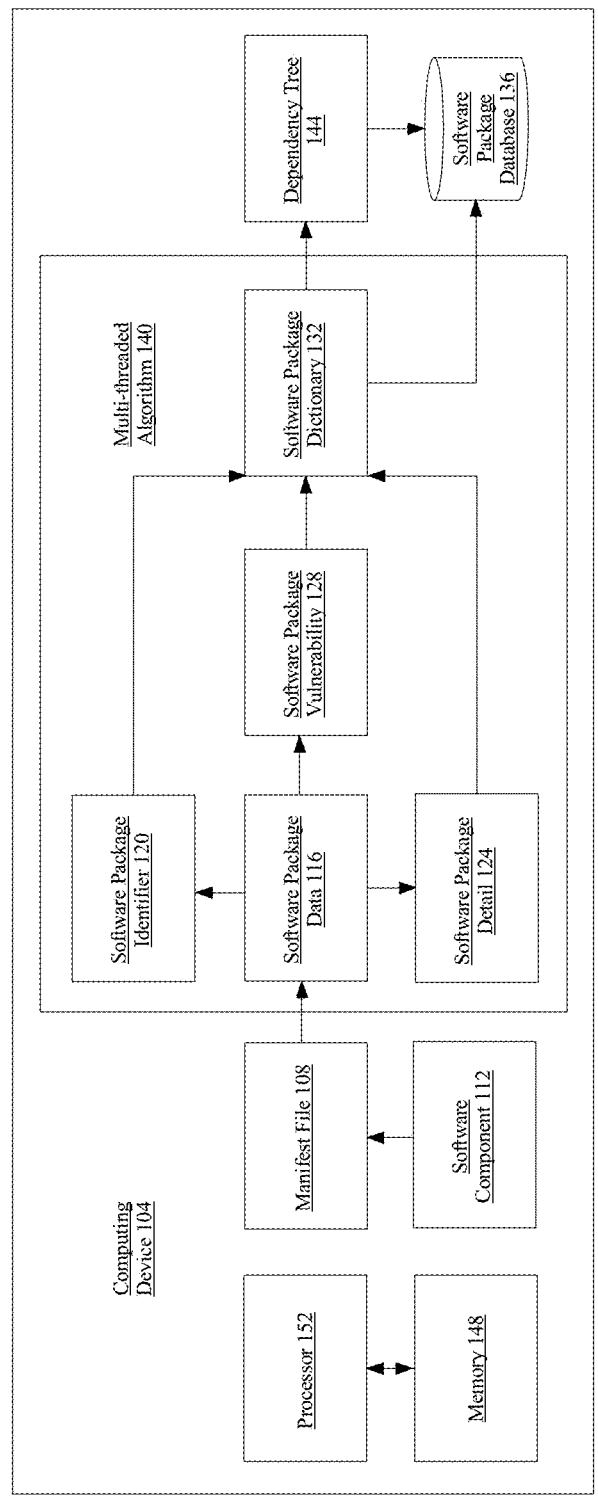
FIG. 1 is a block diagram of an apparatus for scanning vulnerability according to an embodiment of the invention.

Referring now to FIG. 1, an exemplary embodiment of an apparatus 100 for automated malicious software detection is illustrated. Apparatus includes a computing device 104. Computing device 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 104 may include but is not limited to, for example, a computing device or cluster of computing devices in a first location and a second computing device or cluster of computing devices in a second location. computing device 104 may include one or more computing devices dedicated to data storage, security, distribution of traffic for load balancing, and the like. computing device 104 may distribute one or more computing tasks as described below across a plurality of computing devices of computing device, which may operate in parallel, in series, redundantly, or in any other manner used for distribution of tasks or memory between computing devices. computing device 104 may be implemented using a "shared nothing" architecture in which data is cached at the worker, in an embodiment, this may enable scalability of apparatus 100 and/or computing device.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 includes at least a processor 152 and a memory 148 communicatively connected to the at least a processor 152, the memory containing instructions configuring the at least a processor to access at least a manifest file 108. As used in this disclosure, "communicatively connected" means connected by way of a connection, attachment, or linkage between two or more related which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. As used in this disclosure, to "access" means to acquire, obtain, or otherwise to receive a demanding instance. In some cases, demanding instance may include, but is not limited to, a file, a website, a software, a database, and the like. In some embodiments, demanding instance may be a manifest file 108. In some cases, accessing a manifest file 108 may include authorizing computing device 104 for accessing the manifest file 108. As used in this disclosure, "authorizing" means to verifying a permission of an instance. For example, authorizing computing device 104 for accessing manifest file 108 may include verifying the identity and/or permission of a user, a process, a device, or the like. As used in this disclosure, a "manifest file" is a file containing metadata for one or more accompanying files that are part of a coherent unit. For instance, a software component 112 may include a manifest file 108, wherein the manifest file 108 may include metadata describing the name, version number, license, constituent files of the program and the like. In some cases, manifest file 108 may include a plurality of manifest files. In a non-limiting example, manifest file 108 may be a package.json file and/or package-lock.json file for NPM. In another non-limiting example, manifest file 108 may be a gemfile and/or gemfile.lock for Ruby.

With continued reference to FIG. 1, as used in this disclosure, a "software component" is a library and/or collection of files that make up an application and/or program. For example, and without limitation, software component 112 may include a library comprising a single file containing one or more objects. In an embodiment, and without limitation, software component 112 may be linked in programs (dynamic link) and/or the binary relocatable code incorporated into the calling program binary (static link). Dynamically linked libraries may be loaded into memory when first called and may be used by many programs. Dynamic libraries persist in memory as long as there is a link to them from an active program. Binary libraries may be prepared by a compiler from source code and the components packaged by a library archiver, part of the software development suite. Libraries for scripting languages may be simply a file containing a collection of function or object declarations in source code but may also contain compiled binary language extensions. In an embodiment, and without limitation, software component 112 may include a software package comprising a collection of files that make up an application or capability, which may include binary executables, libraries, source text files, documentation files, scripts, and the like thereof, however a library may sometimes be referred to as a package in certain language directives. In another embodiment, and without limitation, software component may include packages that may be built or installed by a system package manager or loaded into memory by a directive statement in a programming language. In another embodiment, and without limitation, software component may include one or more system packages that may become part of the operating system resources and may be used by any script or program.

With continued reference to FIG. 1, in an embodiment, manifest file 108 may include a package manifest file, wherein the package manifest file is a file containing metadata for one or more software packages used in a coherent unit such as software component 112. As used in this disclosure, a "software package" is an assemblage of files.

For instance, a software package may be a namespace that organizes a set of related classes and interfaces. In another non-limiting example, a software package may be a folder, wherein the folder contains a plurality of related files, scripts, images, applications, and the like. In some embodiments, software package may be installed by software developers and represent an immediate programming interface that a software developer's code interacts with. In some cases, package manifest file may be generated and/or processed a package management system. As used in this disclosure, a "package management system" is a collection of software tools that automates the process of installing, upgrading, configuring, and removing computer programs for computing device 104 in a consistent manner. In some cases, package management system may include, but is not limited to, Alpine Package Keeper (apk), dpkg, Node Package Manager, NuGet, Maven, and the like. In other embodiments, package manifest file 108 may include additional information. In a non-limiting example, package manifest file 108 may include an entry point for execution. In another non-limiting example, package manifest file 108 may include a cryptographic hash or a checksum for maintaining authenticity and integrity.

With continued reference to FIG. 1, in other embodiments, manifest file 108 may include an application manifest file. As used in this disclosure, an "application manifest file" is a file embedded in an executable file that containing application metadata. In some cases, application manifest file may include, but is not limited to, a name, version, trust information, required privileges for execution, dependencies on other components of the application and the like thereof. In an embodiment, application manifest file may be an XML (extensible markup language) document. In other embodiments, manifest file 108 may include an assembly manifest file. As used in this disclosure, an "assembly manifest file" is a file containing metadata for one or more assemblies. As used in this disclosure, an "assembly" is a runtime unit consisting of types and other resources. In some cases, application manifest file may include one or more assembly manifest files. Assemblies such as runtime units and/or development units may be referred in application manifest file. Additionally, manifest file 108 may include a cache manifest file. As used in this disclosure, a "cache manifest file" is a file that support a web application running with no network connectivity. In an embodiment, cache manifest file may be a HTML5 cache manifest file, wherein the HTML5 cache manifest file may be used to ensure metadata within the HTML5 cache manifest are available locally. In another embodiment, cache manifest file may be a plain text file. In a non-limited example, a cache manifest file may include a plurality of file paths.

With continued reference to FIG. 1, manifest file 108 further includes at least a direct dependency. In an embodiment, manifest file 108 may include a plurality of direct dependencies. As used in this disclosure, a "direct dependency" is a functionality exported by any software component 112 that is referenced (i.e., used) directly by a program. In some cases, functionality may be exported by a library, API, and the like. In a non-limiting example, direct dependency may be a software package that is referenced directly by a software application. In another non-limiting example, "package.json" may be a direct dependency for a JavaScript application. In some embodiments, manifest file 108 may include one or more indirect dependencies. As used in this disclosure, an "indirect dependency" is a functionality exported by any software component 112 that is not referenced directly but is used by one or more direct dependencies. For example, a software application S include a package A, wherein package A reference (ref) package B, as described in the expression A∈S: A ref B. In this case, package A is the direct dependency of software application S and package B is the indirect dependency of software application S. In some embodiments, direct dependency may include a transitive dependency. As used in this disclosure, a "transitive dependency" is a functional dependency which holds by virtue of transitivity among a plurality of software components 112. In some cases, transitive dependency may be any dependency that is induced by software package that software application references directly. In a non-limiting example, calling a log function may induce a transitive dependency to a library that manages I/O to write log message in a file. In another non-limiting example, converting a web URL into an IP address may use a domain name resolution service, wherein the domain name resolution service is a transitive dependency. In some cases, transitive dependency may be indirect dependency. Further, transitive dependency may be resolved at different times by software component 112. In other embodiments, manifest file 108 may further include a development dependency. As used in this disclosure, a "development dependency" is a functionality exported by any software component 112 that is consumed by requiring them in manifest file 108 during program development phase. In some cases, manifest file 108 may include a plurality of development dependencies. In an embodiment, development dependency may be run as binaries during program development phase. In other embodiments, manifest file 108 may include a self-referential dependency. As used in this disclosure, a "self-referential dependency" is a functionality exported by any software component 112 that refers to itself. For example, a software package may be a self-referential dependency that may reference the software package itself within manifest file 108. As will be appreciated by persons having ordinary skill in the art, after having read the entirety of this disclosure, the foregoing list is provided by way of example and other type of dependencies can be added as an extension or fine tuning of the algorithms disclosed herein.

With continued reference to FIG. 1, in some embodiments, manifest file 108 may further include one or more scripts. As used in this disclosure, a "script" is a sequence of instructions that is interpreted by another program. For instance, script may be a program that is executed by the computing device 104 when processing manifest file 108 as program running. In some cases, script may include a script name. In an embodiment, script may be one line of executable code. For example, manifest file 108 may include a script, wherein the script may include a line "node server.js" for starting a server for a web application. In an embodiment, script may include a pre-script, wherein the pre-script is a script that automatically run by program before any other scripts within manifest file 108. In another embodiment, script may include a post-script, wherein the post-script is a script that automatically run by program after any other scripts within manifest file 108. In a non-limiting example, a manifest file 108 of a program may include a pre-script, wherein the pre-script may contain instructions for create an empty log folder for storing log messages output from the program. In another non-limiting example, a manifest file 108 of a program may include a post-script, wherein the post-script may contain instructions for remove a log folder which contains a plurality of log messages outputted by the program. In other embodiments, script may further include a life cycle script, wherein the life cycle script may include, but is not limited to, prepare script, prepublish script, prepublishOnly script, prepack script, postpack script, and the like. In other embodiments, script may further include a file location, wherein the file location may include a path to an executable. In other embodiments, script may further include a configuration object, wherein the configuration object is an object that set one or more configuration parameters used in software package. As will be appreciated by persons having ordinary skill in the art, after having read the entirety of this disclosure, the foregoing list is provided by way of example and other scripts can be added as an extension or fine tuning of the algorithms disclosed herein.

With continued reference to FIG. 1, processor 152 is further configured to scan manifest file 108 for a software package data 116. As used in this disclosure, "software package data" is data that identifies one or more unique and/or distinct elements of a software package. In some embodiments, software package data 116 may include a software package identifier 120. As used in this disclosure, a "software package identifier" is a unique symbol for a software package. For instance, a software package identifier may be a unique label for a software package in manifest file 108. In some cases, software package identifier 120 may include a software package name. For example, software package name may include a name as typed (NAT), such as but not limited to a software label, library name, and the like thereof. In an embodiment, and without limitation, software package name may include a naming standard. For example, a naming standard may include a prepend comprising a string of characters, symbols, letters, special characters, and the like thereof and/or an append comprising a string of characters, symbols, letters, special characters. For example, and without limitation, a software package with software package name may prepend "ABC_" to all names of the software package. As a further non-limiting example, a software package with software package name may include a unique identifier comprising an appended "ftp-transport" to all names of the software package. As will be appreciated by persons having ordinary skill in the art, after having read the entirety of this disclosure, the foregoing software package name is provided by way of example and other naming standard can be added as an extension or fine tuning of the algorithms disclosed herein.

With continued reference to FIG. 1, in some embodiments, software package identifier 120 may include a correlated software package version number. As used in this disclosure, a "software package version number" is a number that identifies the set of uploaded components in a software package. In some cases, software package version number may include a versioning scheme. For instance, versioning scheme may include semantic versioning (SemVer). As used in this disclosure, a "semantic versioning" is a version scheme that uses a three-part version number. In an embodiment, three-part version number may include a major number (major) of software package as first part. In some cases, increasing major number may indicate one or more breaking changes of software package. In an embodiment, three-part version number may include a minor number (minor) of software package as second part. In some cases, increasing minor number may indicate one or more non-breaking features of software package. Further, three-part version number may include a patch number (patch) of software package as third part. In some cases, increasing patch number may indicating all other non-breaking changes of software package. In a non-limiting example, software package version number may include versioning scheme such as "major.minor.patch." In a non-limiting example, software package version number may by "2.1.3." In some embodiments, software package version number may include a version number prefix, wherein the version number prefix may be a special character. In some cases, version number prefix may be a caret prefix ("^"), wherein the caret prefix represents "compatible with package version." Package version number with caret prefix may update corresponding software package to all future minor numbers and/or patch numbers. In a non-limiting example, a program with a software package, wherein the software package may include a software package version number "^2.3.4" may be used by the program from version (i.e., releases) "2.3.4" to "3.0.0" exclusively. In other cases, version number prefix may be a tilde prefix ("~"), wherein the tilde prefix represents "approximately equivalent to version." Package version number with tilde prefix may update corresponding software package to all future patch numbers, without incrementing the minor numbers. In a non-limiting example, a program with a software package, wherein the software package may include a software package version number "~2.3.4" may be used by the program from version "2.3.4" to "2.4.0" exclusively. As will be appreciated by persons having ordinary skill in the art, after having read the entirety of this disclosure, the foregoing software package version number is provided by way of example and other versioning scheme can be added as an extension or fine tuning of the algorithms disclosed herein.

As a non-limiting and illustrative example, and with continuing reference to FIG. 1, "~2" or "^2" or "2.*" or "2.x" may all be ways in which a system and/or installation package may represent versions ">=2.0.0 and <3.0.0"; "~2.4" or "^2.4" or "2.4.*" or 2.4.x" may all be ways in which a system and/or installation package may represent versions ">=2.4.0 and <2.5.0"; and "~2.2.0" or "^2.2.0" or "2.2.*" or "2.2.x" may all be ways in which a system and/or installation package may represent versions ">=2.2.0 and <2.3.0" in some embodiments. As a further non-limiting example, "(1.0,)" may be a way in which a system and/or installation package may represent versions ">1.0.0"; "[1.0,)" may be a way in which a system and/or installation package may represent versions ">=1.0.0"; "(,1.0)" may be a way in which a system and/or installation package may represent versions "<1.0.0"; "(1.0]" may be a way in which a system and/or installation package may represent versions "<=1.0.0"; "(1.0,2.0]" may be a way in which a system and/or installation package may represent versions ">1.0.0 and <=2.0"; "[1.0,2.0)" may be a way in which a system and/or installation package may represent versions ">=1.0.0 and <2.0"; and "[1.0,2.0)" may be a way in which a system and/or installation package may represent versions ">=1.0.0 and <2.0" in some embodiments. As a further non-limiting example, "~=1.2" may be a way in which a system and/or installation package may represent ">=1.2.0 and <1.3.0"; "!=1.2.2" may be a way in which a system and/or installation package may represent any version that is not equal to "1.2.2"; and "~=1.2, !=1.2.2, <2.0" may be a way in which a system and/or installation package may represent complex version syntax which includes versions that are ">=1.2.0 and <2.0.0" but excludes "1.2.2". Persons skilled in the art, upon reviewing the entirety of this disclosure, will be aware of various alternative or additional ways in which version statements may be formed and/or represented, and various forms of syntax for so doing. Versioning and version numbers are disclosed further in U.S. patent application Ser. No. 17/879,001, filed on Aug. 2, 2022, and entitled "SYSTEMS AND METHODS FOR VERSION CONTROL IN A COMPUTING DEVICE," the entirety of which is incorporated by reference herein.

With continued reference to FIG. 1, in some embodiments, software package data 116 may include a software package detail 124. As used in this disclosure, a "software package detail" is a list of a plurality of properties that related to software package. In some cases, software package detail may include a package description, wherein a package description is descriptive data denoting an author, the location of the repository, version histories, and/or the like thereof. In other cases, software package detail may include a repository URL and/or history, wherein a repository URL and/or history is a package and/or library with the same name. Further, software package detail may include a set of keywords, wherein the set of keywords is a set of significant terms related to software package. In other embodiments, software package detail may include a license identifier, wherein the license identifier is a license indicating permissions and restrictions of corresponding software package. In some cases, software package data 116 may include information involving one or more download counts, wherein a download count is an actual number of downloads for a package or library or a bucketization of download counts (the numbers broken into discrete bins). For instance, and without limitation, bucketization may be consistent with the bucketization in U.S. U.S. patent application Ser. No. 17/460,611, filed on Aug. 30, 2021, and entitled, "SYSTEM FOR AUTOMATED MALICIOUS SOFTWARE DETECTION.". As a further non-limiting example, software package detail 124 may include one or more contributor counts, wherein a contributor count is an actual number of contributors for a package or library or a bucketization of contributor counts (the numbers broken into discrete bins). As a further non-limiting example, software package detail 124 may include one or more release counts, wherein a release count is an actual number of releases for a package or library or a bucketization of release counts (the numbers broken into discrete bins). As a further non-limiting example, software package detail 124 may include a bucketization of time, wherein a bucketization of time is an amount of time between a first and last release of numbers broken into discrete bins. As a further non-limiting example, software package detail 124 may include a release per period, wherein a release per period is a time between releases over a period of time or a bucketization of the release per period (the numbers broken into discrete bins). As a further non-limiting example, software package detail 124 may include NLINES, wherein NLINES are numbers of lines added, changed and/or deleted per a period of time or a bucketization of the number of lines per a period (the numbers broken into discrete bins). As a further non-limiting example, software package detail 124 may include a commit history, wherein a commit history is a number of commits per a period of time or a bucketization of the number of commits per a period of time (the number broken into discrete bins). As a further non-limiting example, software package detail 124 may include a package description, wherein a package description is descriptive data denoting an author, the location of the repository, version histories, and the like thereof. As will be appreciated by persons having ordinary skill in the art, after having read the entirety of this disclosure, the foregoing list is provided by way of example and other software package details can be added as an extension or fine tuning of the algorithms disclosed herein.

With continued reference to FIG. 1, in some embodiments, software package data may include a software package vulnerability 128. As used in this disclosure, a "software package vulnerability" is a flaw in a software package that weakens the overall security of the software package and computing device running program that references the software package. In some cases, software package data may include a plurality of software package vulnerabilities. In other cases, software package data may include no software package vulnerability. In an embodiment, software package vulnerability 128 may include a malicious component. As used in this disclosure a "malicious component" is a library and/or package that comprises a malicious act and/or malicious intent. For example, malicious component may include one or more libraries and/or packages that are placed by typo squatters that have similar names to authentic software package. In an embodiment, typo squatters may rely on several techniques to take advantage of common typing errors. The following examples illustrate common typo squatter techniques for a hypothetical package name, "sckit-learn 1.03", replacing special characters "sckit learn 1.03", removing special characters "scikitlearn 1.03", typing mistake "sckit-learn 1.03" string order "learn-sckit 1.03", character order "scikit-laern 1.03", looking for spelling mistakes "scikit-lern 1.03", creating a new version that is not legitimate "scikit-learn 1.031", hoping for an autocorrect or autocomplete replacement: "sciencekit-learn 1.03", and the like thereof. Additionally, or alternatively, software package vulnerability may include intentional vulnerabilities, backdoors, remote code execution, hidden code, viruses, malware, spyware, data harvesting, intentional error generation, or other malicious actions. In an embodiment, and without limitation, software package vulnerability 128 may be hard to detect after inclusion because they may perform the functions of the originally intended software package exactly as expected, with the addition of a hidden malicious action that is undetectable until activated. In other cases, software package vulnerability 128 may be any component, build, package, library, and the like thereof that is intending to misrepresent, cybersquat, hijack software package and/or software component 112. In an embodiment, software package vulnerability may be determined by an automated malicious software detection system disclosed in U.S. patent application Ser. No. 17/460,611, filed on Aug. 30, 2021, and entitled, "SYSTEM FOR AUTOMATED MALICIOUS SOFTWARE DETECTION," the entirety of which is incorporated by reference herein.

With continued reference to FIG. 1, in an embodiment, without limitation, software package vulnerability 128 may include a memory safety violation, wherein the memory safety violation may include, but is not limited to, buffer overflow, buffer over-read, dangling pointer, and the like thereof. In an embodiment, without limitation, software package vulnerability 128 may include an input validation error, wherein the input validation error may include, but is not limited to, code injection, cross-site scripting, directory traversal, E-mail injection, format string attack, HTTP header injection, HTTP response splitting, SQL injection, and the like thereof. In an embodiment, without limitation, software package vulnerability 128 may include a privilege-confusion bug, wherein the privilege-confusion bug may include, but is not limited to, clickjacking, cross-site request forgery, FTP bounce attack, and the like. In an embodiment, without limitation, software package vulnerability 128 may include a privilege escalation, wherein the privilege escalation is an act of exploiting a bug in a system to gain elevated access to resources that are protected from an admin such as jailbreaking. In an embodiment, without limitation, software package vulnerability 128 may include a race hazard, wherein the race hazard is a condition of a system, wherein the system's substantive behavior is dependent on the sequence of other uncontrollable events. In some cases, race hazard may include, but is not limited to, symlink race, time-of-check-to-time-of-use bug, and the like thereof. In an embodiment, without limitation, software package vulnerability 128 may include a side-channel attack, wherein the side-channel attack is any attack based on extra information that can be gathered from fundamental way an algorithm is implemented, such as a timing attack. In an embodiment, without limitation, software package vulnerability 128 may include a user interface failure. As will be appreciated by persons having ordinary skill in the art, after having read the entirety of this disclosure, the foregoing list is provided by way of example and other software package vulnerabilities 128 can be added as an extension or fine tuning of the algorithms disclosed herein.

With continued reference to FIG. 1, scanning manifest file 108 for software package data 116 may further include identifying software package identifier 120 from software package data 116 In some cases, identifying software package identifier 120 may further include identifying software package version number. In some embodiments, scanning manifest file 108 for software package data 116 may further include iterating direct dependency in manifest file 108 using computing device 104. In some cases, iterating direct dependency may include one or more iterations depending on the number of direct dependencies in manifest file 108. As used in this disclosure, an "iteration" is a repetition of a process of generating a plurality of outcomes, wherein each outcome of the plurality of outcomes is a starting point of the next outcome. In an embodiment, iteration may include a definite number of repetitions. For example, scanning manifest file 108 may include an iteration, wherein the iteration may include repeat a process of tokenizing a first line within manifest file 108 and move to a second line within manifest file 108 for a number of repetitions of 100. In this case, processor 152 in computing device 104 is configured to scan and tokenized a total number of 100 lines within manifest file 108. In another embodiment, iteration may include an indefinite number of repetitions. For example, scanning manifest file 108 may include an iteration, wherein the iteration may include repeat a process of tokenizing a first line within manifest file 108 and move to a second line within manifest file 108 until an end of the file (EOF) has reached. In this case, processor 152 in computing device 104 is configured to scan and tokenized a total number of lines equal to total number of lines of manifest file 108. In some cases, iteration with indefinite number of repetitions may be referred as a recursion. As used in this disclosure, a "recursion" is a type of iteration where is a process that calls itself at least one time until a base case is met at which time the rest of each repetition is processed from last to first. As used in this disclosure, a "base case" is a part of a recursive definition that is not defined in terms of itself. In some cases, recursion may include a plurality of base cases. In a non-limiting example, scanning manifest file 108 may include a recursion, wherein the recursion may include repeat a process and a base case, wherein the process may include tokenize a first line within manifest file 108 and calls itself, wherein the base case is defined as a condition when the first line is EOF. In an embodiment, iteration may be terminated by processor 152 when there are no more direct dependencies and/or transitive dependencies. As will be appreciated by persons having ordinary skill in the art, after having read the entirety of this disclosure, the foregoing list is provided by way of example and other iterations can be added as an extension or fine tuning of the algorithms disclosed herein.

With continued reference to FIG. 1, processor 152 is further configured to extract software package data 116 from manifest file 108. As used in this disclosure, "extracting" means to deriving data from data source in a specific pattern. In some embodiments, extracting software package data 116 from manifest file 108 may include iterating transitive dependency in addition to iterating direct dependency as disclosed above. In some cases, iterating transitive dependency may include iterating transitive dependency recursively. In some embodiments, iterating transitive dependency may further include accessing a current software package data from a current transitive dependency and adding the current software package data to a software package dictionary 132. In some cases, adding current software package data may include adding software package identifier 120, software package detail 124, and software package vulnerability 128 within software package data 116 to software package dictionary 132. As used in this disclosure, a "software package dictionary" is a data structure for storing software package data 116 which describes an unordered set of key value pairs. In this disclosure, a "key value pair" is a data representation of a data object. In some cases, software package dictionary 132 may be an associative memory, or associative arrays, or the like thereof. For example, software package dictionary 132 may be a hash table. In an embodiment, kay value pair may include a unique key, wherein the unique kay may associate with one or more values. In another embodiment, key value pair may include a value, wherein the value may associate with a single key. In some cases, each key value pair of set of key value pairs in software package dictionary 132 may be separated by a comma. In a non-limiting example, a software package dictionary 132 may include a set of key value pairs, wherein the software package dictionary 132 may be expressed as "{[key value pairs]}," and wherein each key value pair in the set of key value pairs may be expressed as "key: value." In another non-limiting example, a software package dictionary 132 may be initialized for storing extracted software package data 116 from manifest file 108, wherein the software package dictionary 132 may include a set of key value pairs, wherein each key value pair of the set of key value pairs further include software package identifier 120 as key and software package detail 124 and/or software package vulnerability 128 as value.

With continued reference to FIG. 1, in some embodiment, software package dictionary 132 may include a term index. As used in this disclosure, a "term index" is a data structure to facilitate fast lookup of element in a collection of data (i.e., index). In some cases, term index may use a zero-based indexing, wherein the zero-based indexing may configure software package dictionary 132 to start with index 0. In some cases, term index may use a one-based indexing, wherein the one-based indexing may configure software package dictionary 132 to start with index 1. In other cases, term index may use a n-based indexing, wherein the n-based indexing may configure software package dictionary 132 to start with any index. In some embodiments, software package dictionary 132 may include a hash function for computing term index. As used in this disclosure, a "hash function" is a function used to map a data of arbitrary size to a fixed-size value. In some cases, a fixed-size value may include, but is not limited to, hash value, hash code, hash digest, and the like. In some cases, hash function may include a hashing technique such as, without limitation, identity hashing, trivial hashing, folding, division hashing, algebraic coding, unique permutation hashing, multiplicative hashing, Fibonacci hashing, Zobrist hashing, middle and ends hashing, character folding, word length folding, radix conversion hashing, rolling hashing, and the like. In a non-limiting example, adding current software package data 116 to software package dictionary 132 may include initializing a key value pair, wherein the key value pair include current software package identifier 120 as key and current software package detail 124 and/or current software package vulnerability 128 as value, and inserting the key value pair to software package dictionary 132. Inserting key value pair to software package dictionary 132 further include applying a hash function to key value pair, wherein the hash function may include word length folding hashing technique. In other cases, hash function may be a custom hash function defined by user. As will be appreciated by persons having ordinary skill in the art, after having read the entirety of this disclosure, the foregoing list is provided by way of example and other components of dictionary can be added as an extension or fine tuning of the algorithms disclosed herein.

With continued reference to FIG. 1, in some embodiments, software package dictionary 132 may be stored in a software package database 136. As used in this disclosure, a "software package database," as used in this disclosure, is a repository configured to store a plurality of software package data. In some cases, software package database 136 may store a plurality of semantic languages, semantic identifiers, string descriptors, version descriptors, and the like thereof. In other cases, software package database 136 may store a plurality of software package identifiers 120, software package version numbers, software package vulnerability 128, dependency tree 144 and the like thereof. Further, software package database 136 may serve to create a robust repository that in part is used to assist in generating dependency tree 144. Dependency tree 144 and generation of dependency tree 144 disclosed here will be described in further detail below. In other embodiments, software package database may be updated when a new software package vulnerability is detected. System and method for detecting software package vulnerability is disclose in reference to U.S. patent application Ser. No. 17/460,611, filed on Aug. 30, 2021, and entitled, "SYSTEM FOR AUTOMATED MALICIOUS SOFTWARE DETECTION,". Persons skilled in the art, upon reviewing the entirety of this disclosure, will be aware of storing recorded data in the context of robust databases.

With continued reference to FIG. 1, any database, such as software package database 136, may include without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, in some embodiments, extracting software package data 116 may further include a multi-threaded algorithm 140. As used in this disclosure, a "multi-threaded algorithm" is an algorithm with capability enabling more than one programs at a time without requiring more than one copies of the program running on computing device 104. In some cases, multi-threaded algorithm 140 may include a plurality of threads. As used in this disclosure, a "thread" is a single sequential flow of control within a program. Additionally, thread may include a plurality of phases. In some cases, phases may include, but is not limited to, beginning, sequence execution, ending, and the like. In an embodiment, multi-threaded algorithm 140 may be a static multi-threaded algorithm, wherein the static multi-threaded algorithm may further include an abstraction of a plurality of virtual processors that are managed explicitly. In a non-limiting example, static multi-threaded algorithm may include specifying a first number of virtual processors at a first point of a process and specifying a second number of virtual processors at a second point of the process. In another embodiment, multi-threaded algorithm 140 may be a dynamic multi-threaded algorithm, wherein the dynamic multi-threaded algorithm 140 may further include a concurrency platform. As used in this disclosure, a "concurrency platform" is a software layer that coordinates, schedules, and manages parallel-computing resources. In some embodiments, concurrency platform may include a plurality of concurrency instructions such as, without limitation, parallel, spawn, sync, and the like. In a non-limited example, a program with 100 software packages, wherein each software package may include one manifest file 108. Each manifest file 108 may be processed in parallel through a multi-threaded algorithm 140, wherein the multi-threaded algorithm 140 may configure to use a total number of ten threads, wherein each thread may be configured to scan and extracting software package data 116 for ten manifest file 108. In another example, without limitation, each direct dependency within manifest file 108 may be processed in parallel through multi-threaded algorithm 140. In other examples, without limitation, each transitive dependency associate with each direct dependency within manifest file 108 may be processed in parallel through multi-threaded algorithm 140. In some embodiments, multi-threaded algorithm 140 may include saving software package data 116, and further distributing saved software package data 116 among all threads. For example, multi-threaded algorithm 140 may share a plurality of saved dependency tree and/or dependency sub-tree among all threads. Dependency tree and dependency sub-tree disclosed here will be described in further detail below. In other embodiments, extracting software package data 116 may include running multi-threaded algorithm 140 on a graphing processing unit (GPU). As will be appreciated by persons having ordinary skill in the art, after having read the entirety of this disclosure, the foregoing list is provided by way of example and other functions of multi-threaded (parallel) programming can be added as an extension or fine tuning of the algorithms disclosed herein.

With continued reference to FIG. 1, in some embodiments, multi-threaded algorithm 140 may include processing one or more manifest file 108 as a function of a batch processing. In some embodiments, batch processing may optimize high-volume and repetitive task such as, without limitation, generating reports, printing documents, and any other non-interactive tasks. As used in this disclosure, a "batch processing" is a method of running a plurality of batch jobs in batches automatically, wherein each batch job of the plurality of batch jobs is a predefined group of processing actions submitted to apparatus 100 to be performed with minimal interaction between user and apparatus. In some cases, batch jobs may include, but is not limited to, simple batch job, batch immediate job, batch MRT job, batch print job, and the like. In a non-limiting example, a batch job may be a program that reads a manifest file 108 and generates a list of software package names. In a non-limiting embodiment, batch processing may include a batch window, wherein the batch window is a period of less-intensive online activity when computing device 104 is able to run batch jobs without interference from, or with, an interactive online system. In a non-limiting embodiment, batch processing may include a batch size, wherein the batch size is a number of work units to be processed within one batch operation. For example, a batch size may be a number of requests to send within one payload. For another example, a batch size may be a number of lines from a file to write into a database. As will be appreciated by persons having ordinary skill in the art, after having read the entirety of this disclosure, the foregoing list is provided by way of example and other elements of batch processing can be added as an extension or fine tuning of the algorithms disclosed herein. In a non-limiting example, multi-threaded algorithm 140 may include a batch processing, wherein the batch processing may include inspecting a list of software packages in manifest file 108 and determining a new software package vulnerability for each software package of the list of software packages exist.

With continued reference to FIG. 1, processor 152 is further configured to generate at least a dependency tree 144 as a function of software package data 116. As used in this disclosure, a "dependency tree," is an acyclic graph with components of manifest file as nodes and relations as edges. In an embodiment, dependency tree may include a plurality of nodes, wherein each node of plurality of nodes may include a dependent software program of software package and corresponding software package identifier 120. Alternatively, or additionally, each node may include software package name and corresponding software package version number. In some embodiments, each node may include software package vulnerability 128. In other embodiments, dependency tree 144 may include one or more nodes, wherein each node may include a first software package data 116 incorporated into a second package data 116, wherein the second package data may include a second software package version number greater than a first software package version number in the first software package data. For example, and without limitation, previous users may have modified a software package in which a dependency tree 144 acts as a repository. In some cases, dependency tree 144 may include nodes of math library that was incorporated, a version of a language processing library that was incorporated, and the like thereof. In a non-limiting embodiment, processor 152 may generate dependency tree 144 in a configuration that specifies one or more attributes that are placed in manifest file 108. For example, and without limitation, a root of a dependency tree 144 may include a software package version number of a software package. In some cases, nodes of dependency tree 144 may further include software component 112 such as APIs, libraries, licenses, and the like thereof. In some embodiments, nodes may include direct dependencies, and may be parent nodes in which child nodes include transitive dependencies. In other embodiments, dependency tree 144 may include a dependency sub-tree. As used in this disclosure, a dependency sub-tree is a dependency tree which is a child of a node in dependency tree 144. Further, dependency tree 144 may be a graph. In some cases, generating at least a dependency tree may include generating a plurality of dependency trees as a function of software package data 116 within manifest file 108. Persons skilled in the art, upon reviewing the entirety of this disclosure, will be aware of generating and/or reading dependency tree comprised in manifest file for purposes as described herein.

With continued reference to FIG. 1, in some embodiments, generating dependency tree 144 may include generating dependency tree 144 as a function of software package dictionary 132. In some embodiments, dependency tree 144 may be represented as a dictionary of lists, wherein the dictionary of lists may include all aspects disclosed above regarding software package dictionary 132. As used in this disclosure, a "list" is an abstract data type that represent a finite number of values. For example, a list may be a container, wherein the container contains a plurality of values. In some embodiments, list may contain one or more duplicate values. In other embodiments, list may contain unique values. In some cases, each value may be an object. In some cases, list may include a concrete data structure, wherein the concrete data structure may include, but is not limited to, tuple, single dimension array, multi-dimension array, linked list, queue, set, stack, stream and the like. In some embodiments, finite number of values may be sorted in a certain order such as, without limitation, ascending order, descending order, and the like thereof. In some cases, sorting a finite number of values may include using a sorting algorithm. Sorting algorithm may include, but is not limited to, selection sort, bubble sort, insertion sort, merge sort, quick sort, heap sort, radix sort, and the like thereof. In other cases, finite number of values may be unordered. Further, list may include one or more computational operations such as, without limitation, prepending a value, appending a value, removing a value, accessing a value, and the like thereof. For a non-limiting example, dependency tree 144 may be a dictionary of lists, wherein the dictionary of lists may contain a plurality of key value pairs. Each key value pair of plurality of key value pairs may represent a node in dependency tree 144. Each key value pair of plurality of key value pairs may include a software package identifier 120 of a direct dependency of manifest file 108 as a key and a list of software package identifiers 120 of corresponding transitive dependencies of manifest file 108 as value. For another non-limiting example, dependency tree 144 may be represented like the following: F{A: [B, C], B: [C, D], C: [E]}, wherein the pair of braces "{}" may represents dictionary and the pair of brackets "[ ]" may represents list. Each key value pair (A: [B, C], B: [C, D], and C: [E]) may include a parent node containing software identifier of direct dependency of manifest file 108 F (A, B, and C) as key and list of child nodes containing software identifiers of corresponding (":") transitive dependencies (B, C, D, and E) as value. As will be appreciated by persons having ordinary skill in the art, after having read the entirety of this disclosure, the foregoing list is provided by way of example and other representations of dependency tree can be added as an extension or fine tuning of the algorithms disclosed herein.

With continued reference to FIG. 1, in some embodiments, dependency tree 144 may further include a software package relationship. As used in this disclosure, a "software package relationship" is a relationship between a first software package and a second software package. In an embodiment, software package relationship may include a dependent relationship, wherein the dependent relationship is a relationship that first software package may depend on second software package. In some cases, under dependent relationship, first software package may not be able to run as expected. In some embodiments, software package relationship may include a pre-dependent relationship, wherein the pre-dependent relationship is a relationship that second software package may be required when installing, updating, and/or configuring first software package. In some cases, under pre-dependent relationship, first software package may need support of second software package during installation of first software package. In some embodiments, software package relationship may include a conflicting relationship, wherein the conflicting relationship is a relationship that first software package and second software package may not coexist in same apparatus 100. In some cases, under conflicting relationship, either first software package or second software package may be removed from apparatus 100. Additionally, or alternatively, dependency tree 144 may further include a plurality of software package relationships. As will be appreciated by persons having ordinary skill in the art, after having read the entirety of this disclosure, the foregoing list is provided by way of example and other software package relationships can be added as an extension or fine tuning of the algorithms disclosed herein.

With continued reference to FIG. 1, dependency tree 144 may include a tree traversal method. As used in this disclosure, a "tree traversal method" is a search method of a tree configured to identify the plurality of software identifier 120 of software package and corresponding software package detail 124 within dependency tree 144. In some cases, tree traversal method may include without limitation, traversal of dependency tree 144. In a non-limiting embodiment, tree traversal method may include, without limitation, in-order traversal, preorder traversal, postorder traversal, level order traversal, and the like thereof. In an embodiment, computing device 104 may perform tree traversal method in order to avoid dependency hell in future scanning. As used in this disclosure, "dependency hell" is a situation in which dependency issues arise when several software packages have dependencies on the same shared software packages or libraries, but they depend on different and incompatible software package version numbers of the shared software packages. Persons skilled in the art, upon reviewing the entirety of this disclosure, will be aware of the various embodiments of identifying version numbers in the context of avoiding incompatible versions.

With continued reference to FIG. 1, in some embodiments, dependency tree 144 may include an introduction path to a node. As used in this disclosure, an "introduction path" is traversing path to a specific node in dependency tree 144. In an embodiment, introduction path may include one or more edges between nodes. In some cases, introduction path may be stored in an ordered list, wherein the ordered list may contain a plurality of nodes and the plurality of nodes may start with a starting node to a target node. In some embodiments, introduction path may be tracked to avoid infinite loops during scanning and/or extracting software package data 116 when manifest file 108 contains one or more self-referential dependencies. In a non-limiting example, a dependency tree 144 may be generated from software package data 116 extracted from manifest file 108 F, wherein the dependency tree 144 may include a plurality of nodes and may be represented like the following: F{A: [B, C], B: [C, D], C: [E]}. Dependency tree 144 may further include an introduction path for node E, wherein the introduction path for E may be "A, B, C, E". When a new dependency sub-tree of node E was added which reference node A during a scan, then introduction path for E may then become "A, B, C, E, A," and computing device 104 may terminate the scan beyond node E.

With continued reference to FIG. 1, generating dependency tree may further include flagging a software package data 116, wherein the software package data 116 contain at least a software package vulnerability. As used in this disclosure, "flagging" means marking a state of an object for a purpose. In some embodiments, flagging may include a flag variable that contains a state. In some cases, state may be in any data type such as, without limitation, Boolean, string, integer, long, double, float, object, and the like thereof. As a non-limiting example, flagging may include a Boolean variable that contains either true or false value. As another non-limiting example flagging may include listing a set of discovered vulnerability parameters (also known as a Common Vulnerability or Exposure (CVE) identifier). As another non-limiting example, flagging may include an integer variable that contains either integer 0 or integer 1. In some cases, flagging may further include switch flag variable from a first state to a second state. In a non-limiting example, a node within dependency tree 144 may include a flag variable, wherein the flag variable may include a Boolean variable that set to false at default. When node contains one or more software package vulnerabilities 128 within corresponding software package data 116, computing device 104 may set flag variable to true, indicating software package represented by node is vulnerable. In some embodiments, flag variable may be stored in software package database 136 and correlate with only one software package data 116. In some embodiments, flagging software package data 116 may further include checking software package database for an existing software package vulnerability. In a non-limiting example, software package data 116 may be flagged if there is at least an existing software package vulnerability 128. In another non-limiting example, software package data 116 may not be flagged if there is no existing software package vulnerability 128.

With continued reference to FIG. 1, generating dependency tree 144 may further include identifying a repeated node within dependency tree 144. As used in this disclosure, a "repeated node" is a dependency sub-tree containing nodes that are already been visited during the scanning process. In an embodiment, repeated node may have same data and arrangement of data with dependency tree 144. In some embodiments, identifying a repeated node may include comparing a first dependency tree and a second dependency tree. In some cases, comparing first dependency tree and second dependency tree may further include traversing both dependency trees using tree traversal method disclosed above. In some cases, comparing first dependency tree and second dependency tree may compare all nodes within first dependency tree and second dependency tree. Further, generating dependency tree may further include terminating the generation as a function of repeated node. For example, a recursion for generating dependency tree 144 may be able to short circuit and exit the recursion when encounter identified repeated node (i.e., dependency sub-tree). In other embodiments, generating dependency tree 144 may further include accessing a software package data 116 within repeated node and flagging the software package data 116 as a circular reference. As used in this disclosure, a "circular reference is a series of reference wherein the last object references the first, resulting in a closed loop.

With continued reference to FIG. 1, processor 152 is further configured to store the at least a dependency tree 144 in a database. In some embodiments, processor 152 may be configured to store dependency sub-trees in a database. In some cases, processor may search the database for sub-trees. If a matching subtree is found, the recursion mentioned above may be short-circuited as sub-tree for the same package ID and/or package version may be considered identical. In some embodiment, processor 152 may be configured to store dependency tree 144 in software package database. In some embodiments, storing the at least a dependency tree 144 may further include storing a timestamp of dependency tree 144. As used in this disclosure, a "timestamp" is a sequence of characters or encoded information identifying when a certain event occurred. In some cases, timestamp may include a date and/or a time. In a non-limiting example, timestamp may include a date and time of a last scan of manifest file 108. In another non-limiting example, timestamp may include a date and time of an initial scan of manifest file 108. In some embodiments, storing the at least a dependency tree 144 may include further storing a flag variable, wherein the flag variable holding a scan status. In some cases, scan status may include, but is not limited to, no scan, in queue, scan in progress, fully scanned, and the like thereof. In a non-limiting example, a dependency tree 144 may be generated as a function of software package dictionary 132, wherein the dependency tree 144 may be further stored in software package databases along with a flag variable holding a scan status of "fully scanned." In some embodiments, storing dependency tree 144 may further include storing a software package vulnerability count, wherein the software vulnerability count is a variable representing number of existing software package vulnerability 128 found in software component 112 based on manifest file 108. In some embodiments, storing the at least a dependency tree 144 may further include storing a scan count, wherein the scan count is a variable representing number of times manifest file 108 of dependency tree 144 has been scanned. In some cases, scan count may also include number of times dependency tree 144 has been generated. As will be appreciated by persons having ordinary skill in the art, after having read the entirety of this disclosure, the foregoing list is provided by way of example and other data component that can be stored in software package database along with dependency tree can be added as an extension or fine tuning of the algorithms disclosed herein.

With continued reference to FIG. 1, in some embodiments, after one or more initial scan runs, computing device 104 may extract one or more direct dependencies from each manifest file 108 of the initial scans. Additionally, in some embodiments, computing device 104 may extract one or more direct dependencies from each manifest file 108 of the last full scans. In some embodiments, computing device may compare the direct dependencies of the initial scans to the direct dependencies of the last full scan to determine a dependency difference. In embodiments where the direct dependencies are the same between the initial scans and the last full scan, there may be said to be "no dependency difference."

With continued reference to FIG. 1, in some embodiments, computing device 104 may compare the date on which the last full scan was performed to a timeframe value. For the purposes of this disclosure, a "timeframe value" is a threshold value representing an acceptable amount of time since the last full scan. In an event where the date on which the last full scan was performed is old enough that it exceeds the timeframe value, computing device 104 may perform a full scan regardless of whether computing device 104 has determined that there is a dependency difference.

With continued reference to FIG. 1, if computing device 104 is using an offline process and has identified new vulnerabilities using the initial scans (i.e. vulnerabilities not identified in the last full scan), then computing device may run a full scan. In some embodiments, the vulnerabilities may be determined from the manifest files 108 of the initial scans and the last full scan, respectively.

With continued reference to FIG. 1, if any of the direct dependency information from the initial scans differs from the direct dependency information from the last full scan, then computing device 104 may run a full scan. As non-limiting examples, direct dependency information may include a count of manifests, manifest names, a count of direct dependencies, direct dependency ids, and/or version numbers.

With continued reference to FIG. 1, in cases where (1) the date of the last full scan does not exceed the timeframe value, (2) computing device 104 is using an offline process and has identified new vulnerabilities from the initial scans, and/or (3) any of the direct dependency information differs between the initial scans and the last full scans, computing device 104 may not perform or "skip" the fill scan. In some embodiments, in cases where the full scan is skipped, computing device may set the "full scan performed" flag to false. This denotes that the full scan was skipped or not performed for historical tracking purposes.

Figure 2:
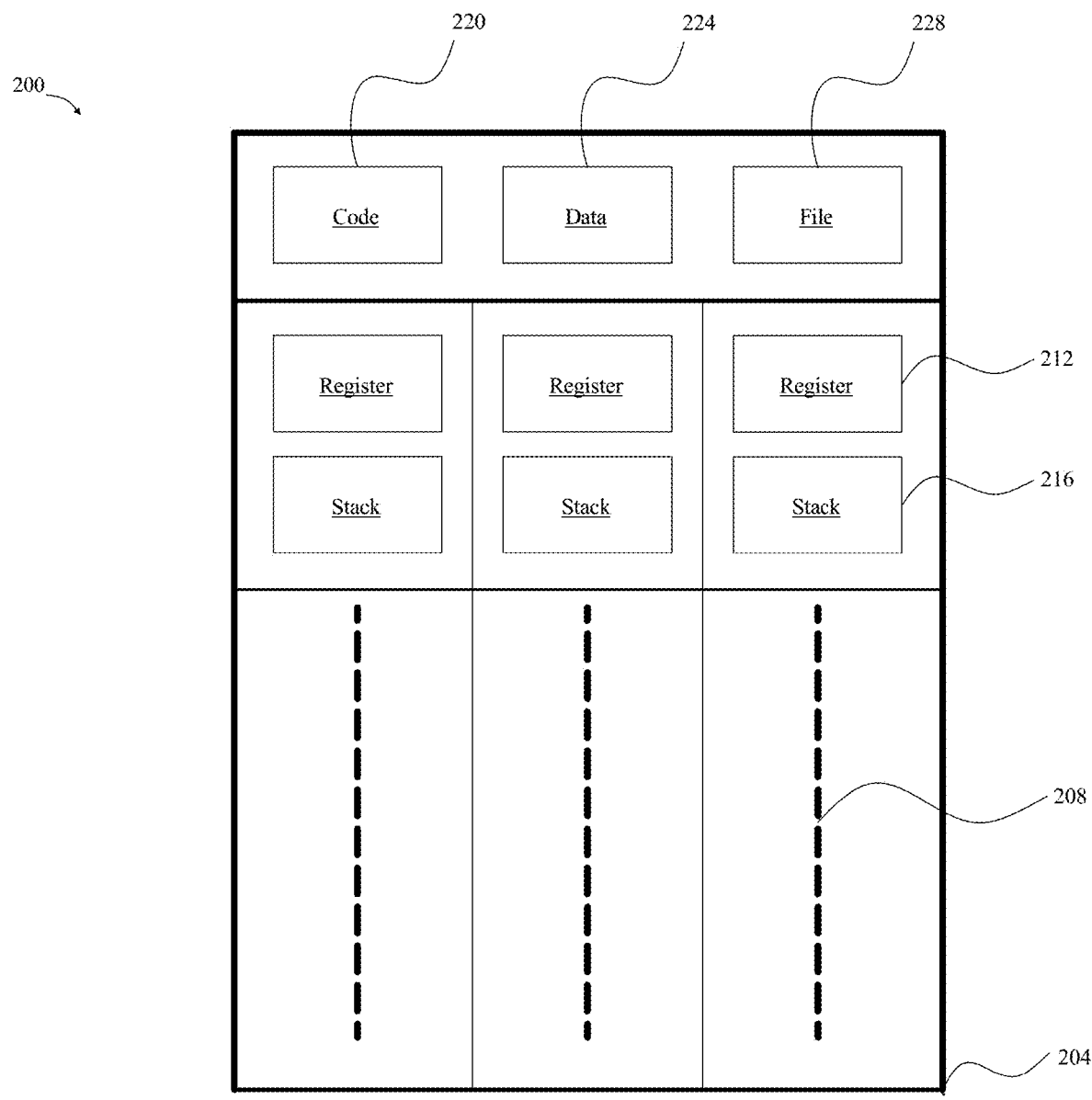
FIG. 2 is a diagrammatic representation of an exemplary embodiment of a multi-threaded algorithm.

Now referring to FIG. 2, an exemplary embodiment 200 of a multi-threaded algorithm is illustrated. In an embodiment, a multi-threaded algorithm 200 may include a process 204. As used in this disclosure, a "process" is an instance of a computer program that is being executed by at least one thread, where in the computer program is a passive collection of instructions. In some cases, multi-threaded algorithm 200 may include executing a plurality of instructions in parallel. In other cases, multi-threaded algorithm 200 may include applying a parallel computing. As used in this disclosure, a "parallel computing" is a type of computation in which a plurality of threads 208 is carried out simultaneously. In some cases, computer program may be stored in a file on a disk. In an embodiment, process 204 may execute computer program after being loaded from disk into memory. In another embodiment, a plurality of processes 204 may be associated with the same memory in computing device 104. In some cases, without limitation, parallel computing may include a bit-level parallelism, wherein the bit-level parallelism is a form of parallel computing based on increasing a word size of processor in computing device 104. In an embodiment, increased word size may reduce the number of instructions processor must execute in order to perform an operation on a variable, wherein the variable may include a size that is greater than a length of word. As used in this disclosure, a "word" is a natural unit of data handled by processor of computing device 104. In a non-limiting example, adding a first 16-bit integer and a second 16-bit integer using an 8-bit processor, wherein the 8-bit processor may add a lower-order 8-bits of the first 16-bit integer and a lower-order 8-bits of the second 16-bit integer. 8-bit processor may then further add a higher-order 8-bits of first 16-bit integer and a higher-order 8-bits of second 16-bit integer. Therefore, two instructions to complete an addition operation. Replacing 8-bit processor with a 16-bit processor may be able to complete addition operation in a single instruction. In some cease, parallel computing may further include an instruction-level parallelism, wherein the instruction-level parallelism is the simultaneous execution of a sequence of instructions in computer program. In some embodiments, instruction-level parallelism may include an average number of instructions run per step of parallel computing. In some cases, parallel computing may further include a data parallelism, wherein the data parallelism is a parallelization across plurality of processors in computing device 104. In an embodiment, data parallelism may include distributing data across a plurality of computing nodes, wherein each computing node of the plurality of computing nodes may operate data in parallel. In another embodiment, data parallelism may be applied to data structures such as, without limitation, single dimension array, multi-dimension array, matrix, and the like thereof. In a non-limiting example, a data parallelism may divide an array of n elements among x number of processors (i.e., processors), wherein each processor may have n/x number of elements of the array and may perform specific operation on these number of elements in parallel. In other cases, parallel computing may further include a task parallelism, wherein the task parallelism is a form of parallelization of computer code across a plurality of processors in computing device 104. In an embodiment, task parallelism may include distributing a plurality of tasks across a plurality of processors, wherein each task of the plurality of tasks may be performed concurrently by the plurality of processors. Plurality of tasks may be performed on same data. In another embodiment, task parallelism may include distributing a plurality of different tasks at the same time. In a non-limiting example, a computing device 104 with two processors, may execute a first task on a first processor and execute a second task on a second processor simultaneously, wherein both the first task and the second task may be assigned using a conditional statement such as, without limitation, an if-else clause. As persons skilled in the art, upon reviewing the entirety of this disclosure, will be aware of various parallel programming that may be applied to multi-threaded algorithm 200 as described in this disclosure.

With continued reference to FIG. 2, in some embodiments, multi-threaded algorithm 200 may include utilizing a register 212. As used in this disclosure, a register is a quickly accessible location available to processor of computing device 104. In an embodiment, register 212 may be a processor register. In some cases, register 212 may include a fast storage. In some cases, register 212 may include one or more specific hardware functions. In other cases, register may be read-only and/or write-only. In some embodiments, register 212 may include an assigned memory address. In some embodiments, register 212 may load data from a memory of computing device 104, wherein the memory may include, but is not limited to, shared memory, distributed memory, distributed shared memory, and the like thereof. In a non-limiting example, a register 212 may be used by a central computing unit (CPU) in computing device 104, wherein the CPU may currently run a particular thread 208. In another non-limiting example, a register 212 may contain a plurality of current working variables of a process 204. Additionally, or alternatively, multi-threaded algorithm may include utilizing a stack 216. As used in this disclosure, a "stack" is a data structure that keeps track of an execution history of thread 208. As persons skilled in the art, upon reviewing the entirety of this disclosure, will be aware of various components of computing device 104 that may be utilized by multi-threaded algorithm 200 as described in this disclosure.

With continued reference to FIG. 2, In an embodiment, process 204 may include a plurality of threads 208. In some cases, thread 208 may be a lightweight process. In some embodiments, thread 208 may belong to a single process of computing device 104. In other embodiments, thread 208 may not exist without process 204 within computing device 104. Alternatively, and additionally, thread 208 may represent a separate flow of control. In some embodiments, thread 208 may be used in a network server and/or web server. In some cases, plurality of threads 208 may exchange information such as, without limitation, code 220, data 224, files 228, and the like thereof. In some cases, each thread may be transparent to other threads within plurality of threads 208. Further, thread 208 may include a thread life cycle. As used in this disclosure, a "thread life cycle" is a life span of thread 208 that is divided into several states. In some cases, thread life cycle may include a new state, wherein the new state is when an initial state of newly created thread 208. In an embodiment, newly created thread 208 may stay in new state until process 204 starts. In some cases, thread life cycle may include a runnable state, wherein the runnable state is when thread 208 starts and becomes runnable. In an embodiment, thread 208 with runnable state may carry out a task that has been assigned to thread 208. In some cases, thread life cycle may include a waiting state, wherein the waiting state is when a first thread is waiting for a second thread to complete a task. In an embodiment, second thread may transmit a signal to first thread upon completion of task. In another embodiment, first thread may receive a signal from second thread and may exist waiting state upon receiving the signal. In other embodiments, waiting state may be a timed waiting state, wherein the timed waiting state may include a method with a timeout parameter. In other cases, thread life cycle may include a terminated state, wherein the terminated state is when thread 208 complete an assigned task. As persons skilled in the art, upon reviewing the entirety of this disclosure, will be aware of various states within thread life cycle of thread 208 that may be used in multi-threaded algorithm 200 as described in this disclosure.

With continued reference to FIG. 2, In an embodiment, multi-threaded algorithm 200 may include a concurrent execution type. As used in this disclosure, a "concurrent execution type" is a type of execution that occurs when processor successfully switches resources between plurality of threads 208 in process 204 on a single processor of computing device 104. In another embodiment, multi-threaded algorithm 200 may also include a parallel execution type. As used in this disclosure, a "parallel execution type" is a type of execution that occurs when each thread of plurality of threads in process 204 executes on a distinct processor of computing device 104 simultaneously. In a non-limiting example, multi-threaded algorithm 200 with concurrent execution type may include a single process 204 using a single processor of computing device 104, wherein the process 204 may further include a plurality of thread 208. Each thread of plurality of threads 208 may be assigned to extract software package data 116 from a certain number of software package based on manifest file 108, wherein the number of software package to extract may be determined by process 204 as a function of number of threads 208 within process 204. Each thread may enter a waiting state to wait other threads completing their corresponding extraction. When all threads of plurality of threads 208 are in a terminated state, single process 204 may gather each extracted software package data 116 from each thread of plurality of threads 208 and may store the gathered extracted software package data 116 in memory of computing device 104 for future operation, such as, without limitation, generating dependency tree 144 as a function of gathered extracted software package data 116. In another non-limiting example, multi-threaded algorithm 200 with parallel execution type may include a process 204 using a plurality of processors of computing device 104, wherein the process 204 may further include a plurality of thread 208. Each thread of plurality of threads 208 may be assigned to extract software package data 116 from a certain number of software packages based on manifest file 108, wherein the number of software packages to extract may be determined by process 204 as a function of number of threads 208 within process 204 and number of processors. Each thread may enter a waiting state to wait other threads completing their corresponding extraction. When all threads of plurality of threads 208 are in a terminated state, a process 204 may gather each extracted software package data 116 from each thread of plurality of threads 208 and may store the gathered extracted software package data 116 in memory of computing device 104 for future operation, such as, without limitation, generating dependency tree 144 as a function of gathered extracted software package data 116.

With continued reference to FIG. 2, in some embodiments, multi-threaded algorithm 200 may further include dynamic multi-threading. In some cases, dynamic multi-threading may include a parallel multi-threading pipeline, wherein the parallel multi-threading pipeline is a data collector pipeline that supports parallel execution. In an embodiment, parallel multi-threading pipeline may run in one or more threads 208. In some cases, dynamic multi-threading may include dynamically changing the number of threads 208 of process 204 while process 204 running. In a non-limiting example, a program execution may begin with a single thread 208. Computing device 104 may then divides program into portions at iteration and may executed in a plurality of threads in parallel multi-threading pipeline. Further, multi-threading algorithm 200 may further include an execution pipeline, wherein the execution pipeline may include a plurality of steps such as, without limitation, fetching data, decoding instructions, renaming files, issuing data and files, reading data, executing instructions, retiring, and the like thereof. Additionally, or alternatively, multi-threading algorithm 200 may further include a recovering pipeline for memory mispredictions, wherein the recovering pipeline may include fetching history from a trace buffer in addition to plurality of steps disclosed in execution pipeline above. As will be appreciated by persons having ordinary skill in the art, after having read the entirety of this disclosure, the foregoing list is provided by way of example and other type of pipeline and/or steps in pipeline can be added as an extension or fine tuning of the algorithms disclosed herein.

Figure 3:
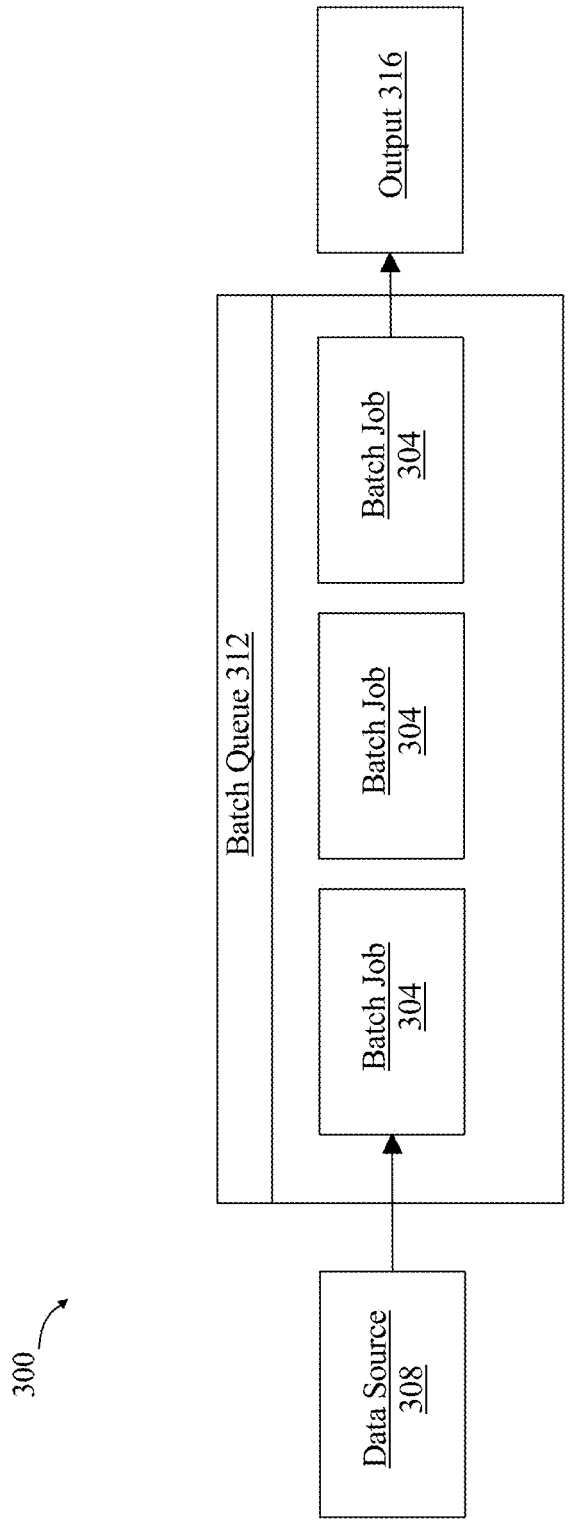
FIG. 3 is a diagrammatic representation of an exemplary embodiment of batch processing.

Now referring to FIG. 3, an exemplary embodiment 300 of batch processing is illustrated. In an embodiment, batch processing 300 may include a plurality of batch jobs 304, wherein each batch job of plurality of batch jobs 304 may be operate on a data source 308 with a predefined instruction. For example, without limitation, a data source 308 may be a manifest file 108. In some cases, predefined instruction may include a file, script, computer code, program, and the like thereof. In some embodiments, each batch job of plurality of batch jobs 304 may be operate on different data source 308. In some cases, batch job 304 may be created and/or submitted by a user. In other cases, batch job 304 may be created and/or submitted by a network server and or computing device 104. Further, batch job 304 may produce an output 316 after execution. In some cases, output 316 may include a new batch job 304. Additionally, or alternatively, batch job 304 may include a job metadata. In some cases, job metadata may further include a user-related data containing data of a user that created and/or submit batch job 304 such as, without limitation, user identifier, username, user permission, and the like thereof. In some cases, job metadata my further include a job-related data, wherein the job-related data may include, without limitation, data regarding to job instructions, requirements, submitted time, submitted file, and the like thereof. In a non-limiting example, batch processing may include a plurality of batch jobs 304, wherein the plurality of batch jobs 304 may be scan and/or extract a plurality of software package data 116 from a plurality of manifest file 108 of a software component 112 and output plurality of software package data 116 as outputs. As will be appreciated by persons having ordinary skill in the art, after having read the entirety of this disclosure, the foregoing list is provided by way of example and other components of batch job can be added as an extension or fine tuning of the algorithms disclosed herein.

With continued reference to FIG. 3, in some embodiments, batch processing 300 may include a batch queue 312. As used in this disclosure, a "batch queue" is a data structure containing one or more batch jobs to run. In some cases, batch processing 300 may include a plurality of batch queues. In some embodiments, batch queue 312 may include assigning a job priority to batch job 304, wherein the job priority is a degree of importance of batch job 304. For instance, batch job 304 with high job priority assigned by batch queue 312 may be run first, and batch job 304 with lower job priority assigned by batch queue 312 may be run last. In some cases, batch queue 312 may include arranging one or more batch jobs 304 as a function of job priority of each batch job 304. In some embodiments, batch queue 312 may include determining an estimated execution time for batch job 304, wherein the estimated execution time is a time measurement indicating how much time corresponding batch job 304 may take from starting batch job 304 to terminating batch job 304. In some embodiments, batch queue 312 may include removing batch job 304 upon a user request. In other embodiments, batch queue 312 may include removing batch job 304 as a function of a timeout parameter of batch job 304. In a non-limiting example, a batch processing 300 may be used within a multi-threaded algorithm 200. Each thread of plurality of threads 208 may include batch processing 300 for scanning and/or extracting software package data 116 from manifest file 108. Each thread of plurality of threads 208 may create and submit a plurality of batch jobs 304, wherein each batch job of plurality of batch jobs may include instructions of scanning and/or extracting software package data 116. A batch queue 312 may be initialized to store plurality of batch jobs 304 and run batch job according to a First-in-First-out (FIFO) order. Thread 208 may be terminated when batch queue 312 contains no batch job 304. As will be appreciated by persons having ordinary skill in the art, after having read the entirety of this disclosure, the foregoing list is provided by way of example and other components and capabilities of batch queue can be added as an extension or fine tuning of the algorithms disclosed herein.

Figure 4:
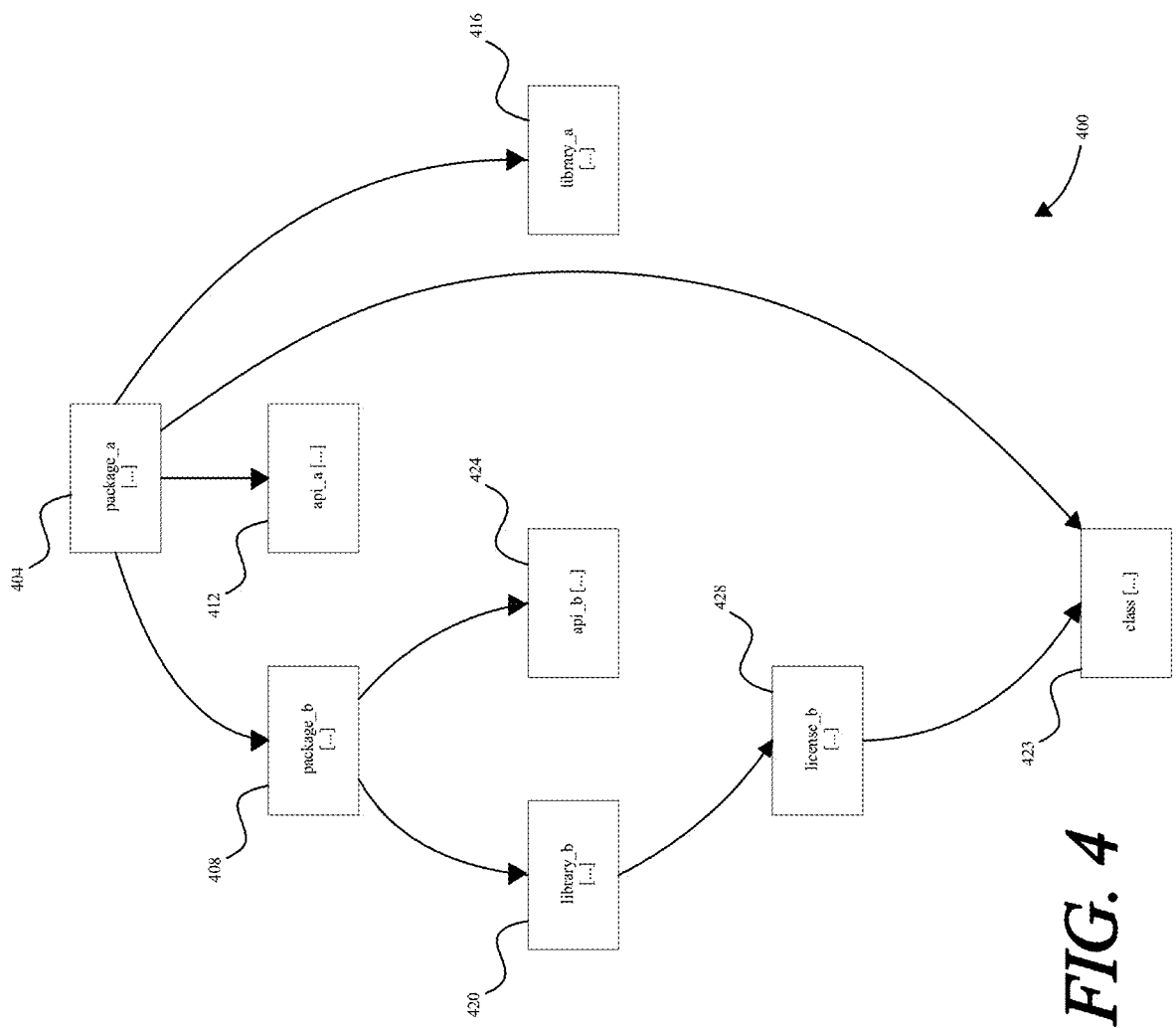
FIG. 4 is a block diagram illustrating an exemplary embodiment of a dependency tree.

Referring now to FIG. 4, a diagrammatic representation of a dependency tree 400 is illustrated. Dependency tree 400 includes a root 404. In a non-limiting embodiment, root node 404 may include a software package identifier and software package data. Root 404 may have a plurality of children. Each child may denote a transitive dependency as described in the entirety of this disclosure. Node 408 may include another software package that the software package of root 404 depends on. Node 408 may include its own software package identifier and software package data. In a non-limiting embodiment, root 404 may have a leaf 412. Leaf 412 may include an API that includes a declaration that software package of root 404 depends on. In some embodiments, an API of leaf 412 may not depend on previous APIs, builds, software packages, and the like thereof. In another non-limiting embodiment, software package of root 404 may also depend on leaf 416. Leaf 416 may include a library that software package of root 404 depends on. Persons skilled in the art, upon reviewing the entirety of this disclosure, will be aware of the various software components that a package depends on in the context of dependency.

With continued reference to FIG. 4, node 408 may also have a plurality of child nodes. Software package of node 408 that software package of root 404 depends on may also include its own dependent software components. In a non-limiting embodiment, software package of root 408 may depend on an API of node 424. In another non-limiting embodiment, software package of root 408 may depend on a library denoted by node 420, wherein that library also depends on some other software components. In a non-limiting embodiment, library denoted by node 420 may depend on some security component such as a license denoted by node 428. In another non-limiting embodiment, license denoted by node 428 may further depend on software components such as a class denoted by node 432. In some embodiments, class denoted by node 332 may also be a dependent software component of software package of root 304. Persons skilled in the art, upon reviewing the entirety of this disclosure, will be aware of the various embodiments of dependencies within a software package for purposes as described herein.

Figure 5:
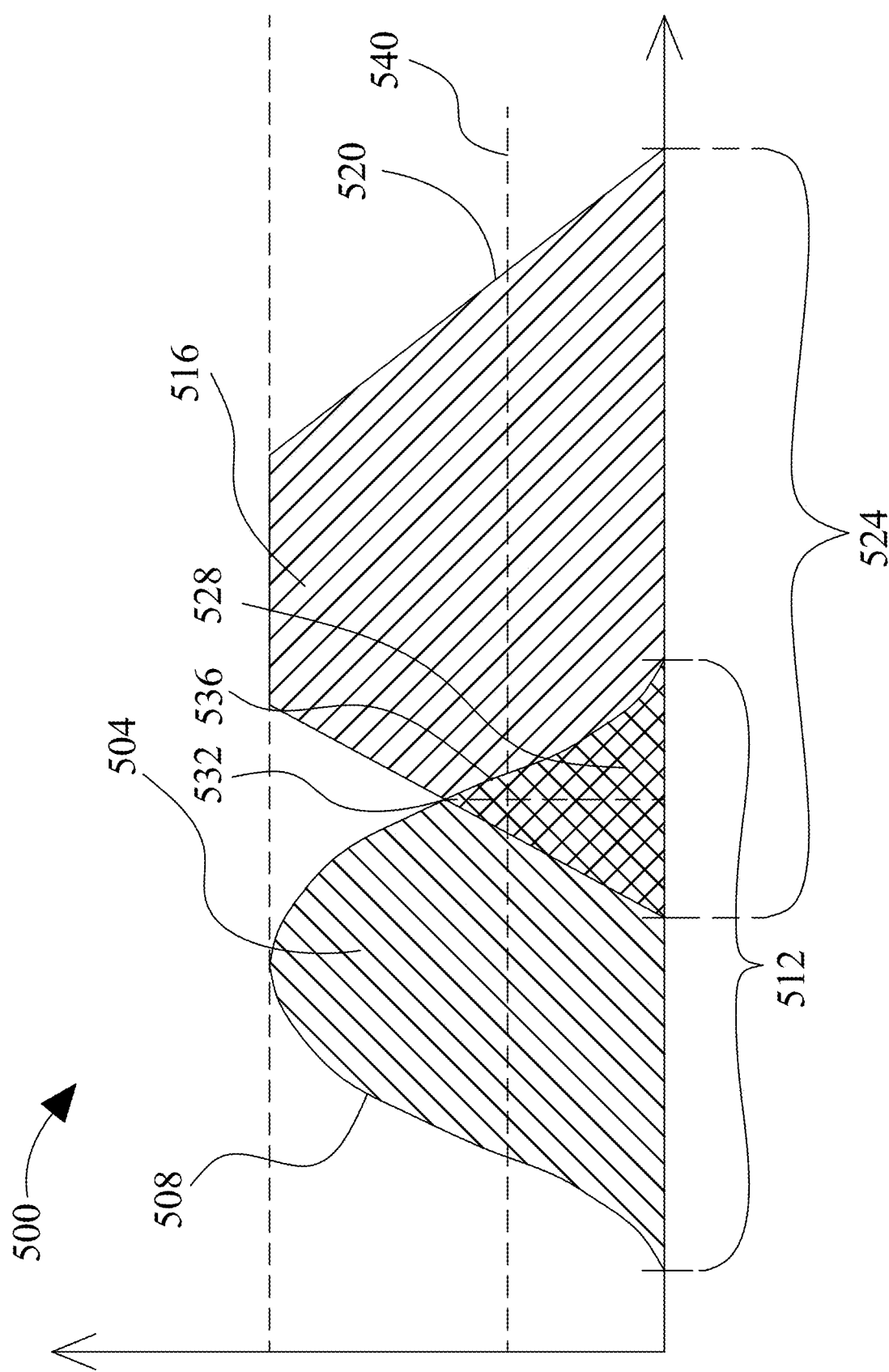
FIG. 5 is a block diagram illustrating exemplary embodiments of fuzzy sets.

Referring to FIG. 5, an exemplary embodiment of fuzzy set comparison 500 is illustrated. A first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \le x < b \\ \frac{c-x}{c-b}, & \text{if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including software package dictionary 132 and a predetermined class, such as without limitation of dependency tree 144. A second fuzzy set 516, which may represent any value which may be represented by first fuzzy set 504, may be defined by a second membership function 520 on a second range 524; second range 524 may be identical and/or overlap with first range 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range 512 and/or second range 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models and/or software package dictionary 132 and a predetermined class, such as without limitation dependency tree 144 categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify a software package dictionary 132 with dependency tree 144. For instance, if a dependency tree 144 has a fuzzy set matching software package dictionary 132 fuzzy set by having a degree of overlap exceeding a threshold, computing device 104 may classify the software package dictionary 132 as belonging to the dependency tree 144 categorization. Where multiple fuzzy matches are performed, degrees of match for each respective fuzzy set may be computed and aggregated through, for instance, addition, averaging, or the like, to determine an overall degree of match.

Still referring to FIG. 5, in an embodiment, a software package dictionary 132 may be compared to multiple dependency tree 144 categorization fuzzy sets. For instance, software package dictionary 132 may be represented by a fuzzy set that is compared to each of the multiple dependency tree 144 categorization fuzzy sets; and a degree of overlap exceeding a threshold between the software package dictionary 132 fuzzy set and any of the multiple dependency tree 144 categorization fuzzy sets may cause computing device 104 to classify the software package dictionary 132 as belonging to dependency tree 144 categorization. For instance, in one embodiment there may be two dependency tree 144 categorization fuzzy sets, representing respectively dependency tree 144 categorization and a dependency tree 144 categorization. First dependency tree 144 categorization may have a first fuzzy set; Second dependency tree 144 categorization may have a second fuzzy set; and software package dictionary 132 may have a software package dictionary 132 fuzzy set. Processor 104, for example, may compare a software package dictionary 132 fuzzy set with each of dependency tree 144 categorization fuzzy set and dependency tree 144 categorization fuzzy set, as described above, and classify a software package dictionary 132 to either, both, or neither of dependency tree 144 categorization nor independency tree categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, software package dictionary 132 may be used indirectly to determine a fuzzy set, as software package dictionary 132 fuzzy set may be derived from outputs of one or more machine-learning models that take the software package dictionary 132 directly or indirectly as inputs.

Figure 6:
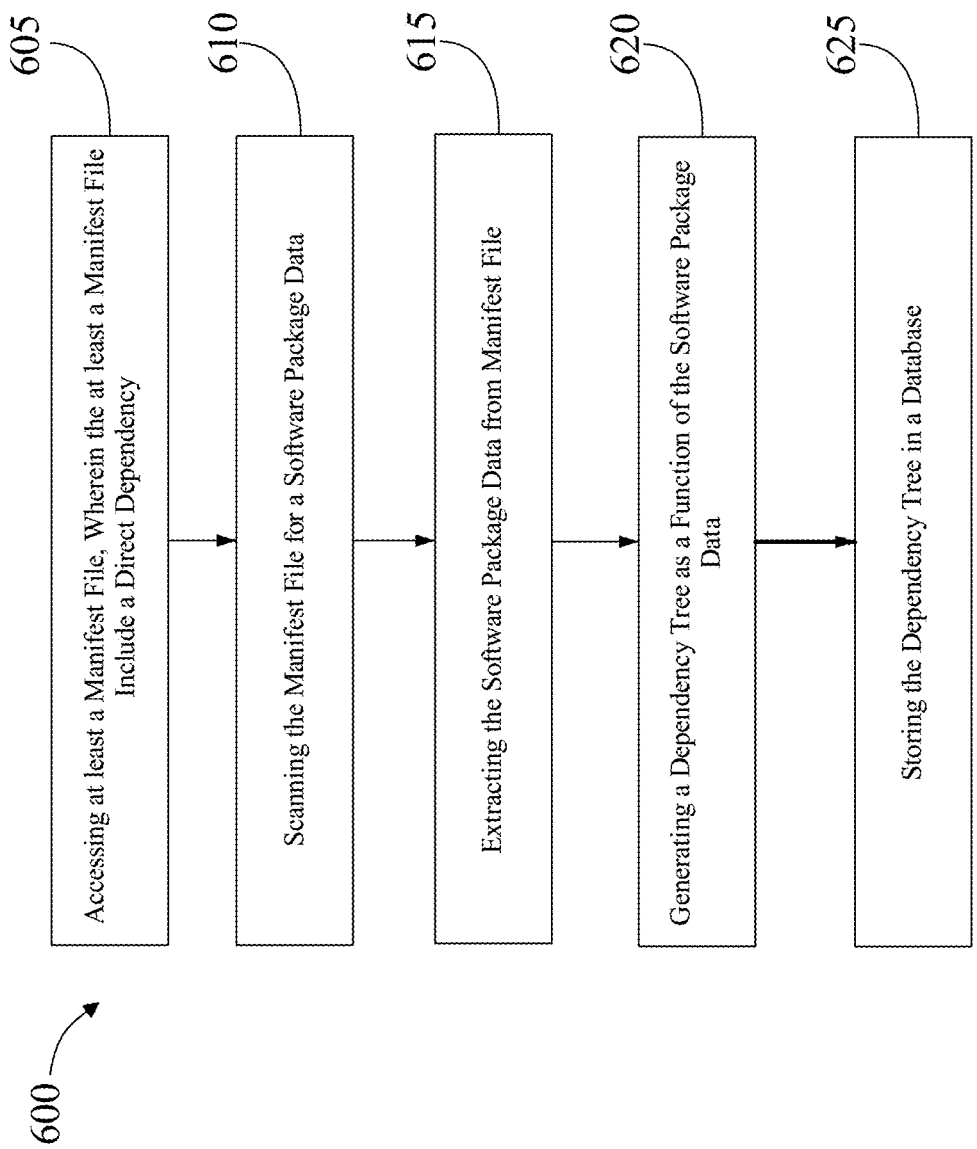
FIG. 6 is a flow diagram illustrating an exemplary embodiment of a method for scanning vulnerability.

Now referring to FIG. 6, an exemplary embodiment 600 of a method for scanning vulnerabilities is illustrated. At step 605, a processor 152 access at least a manifest file 108, wherein the at least a manifest file includes at least a direct dependency. This may be implemented, without limitation, as disclosed above in reference to FIGS. 1-5. In some embodiments, manifest file 108 may be included in a software component 112. Software component 112 may include any of the software component 112 as described above, in reference to FIGS. 1-6. In some embodiments, direct dependency may include a transitive dependency. In other embodiments, manifest file 108 further include a software package identifier 120, wherein the software package identifier comprises a correlated software package version number. This may be implemented, without limitation, as described above in reference to FIGS. 1-5.

With continued reference to FIG. 6, at step 610, processor 152 scans the manifest file 108 for a software package data 116. This may be implemented, without limitation, as described above in reference to FIGS. 1-5. In some embodiments, software package data 116 may further include a software package vulnerability. In some embodiments, scanning manifest file 108 may further include identifying software package identifier 120 from software package data 116. In some embodiments, scanning manifest file 108 may further include iterating direct dependency in manifest file 108. This may be implemented without limitation, as described above in reference to FIGS. 1-5.

With continued reference to FIG. 6, at step 615, processor 152 extracts the software package data 116 from the manifest file 108. This may be implemented, without limitation, as described above in reference to FIGS. 1-5. In some embodiments, this may include iterating the transitive dependency, wherein iterating the transitive dependency may further include accessing a current software package data from a current transitive dependency, obtaining a software package detail 124 from the current software package data, and adding the software package detail 124 to a dictionary. In some embodiments, transitive dependencies may be stored in a software package database as one or more manifest files. Manifest files do not always list transitive dependencies. In some embodiments, transitive dependencies may be resolved from one or more manifest files in a software package database. In some embodiments, vulnerability data may be stored in a vulnerability database. In some embodiments, vulnerability data may be resolved from a transitive database. Dictionary may include any dictionary described above in reference to FIGS. 1-5. Further dictionary may be stored in a database. Database may include any database described above in reference to FIGS. 1-5. In other embodiments, extracting the software package data 116 may further include using a multi-threaded algorithm. This may be implemented, without limitation, as described above in reference to FIGS. 1-5.

With continued reference to FIG. 6, at step 620, processor 152 generate at least a dependency tree 144 as a function of the software package data 116. This may be implemented, without limitation, as described above, in reference to FIGS. 1-5. In some embodiments, dependency tree 144 may include a dictionary of list representation. In some embodiments, dependency tree 144 may further include a software package relationship. Dependency tree 144 may include any dependency tree described above in reference to FIGS. 1-5. In some embodiments, generating the dependency tree 144 may further include flagging a software package data 116, wherein the software package data 116 include at least a software package vulnerability. In other embodiments, generating the dependency tree 144 further include identifying a repeated node within the dependency tree 144 and terminate the generation as a function of the repeated node. This may be implemented without limitation, as described above in reference to FIGS. 1-5.

With continued reference to FIG. 6, at step 625, processor 152 may store the dependency tree 144 in a database. This may be implemented, without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
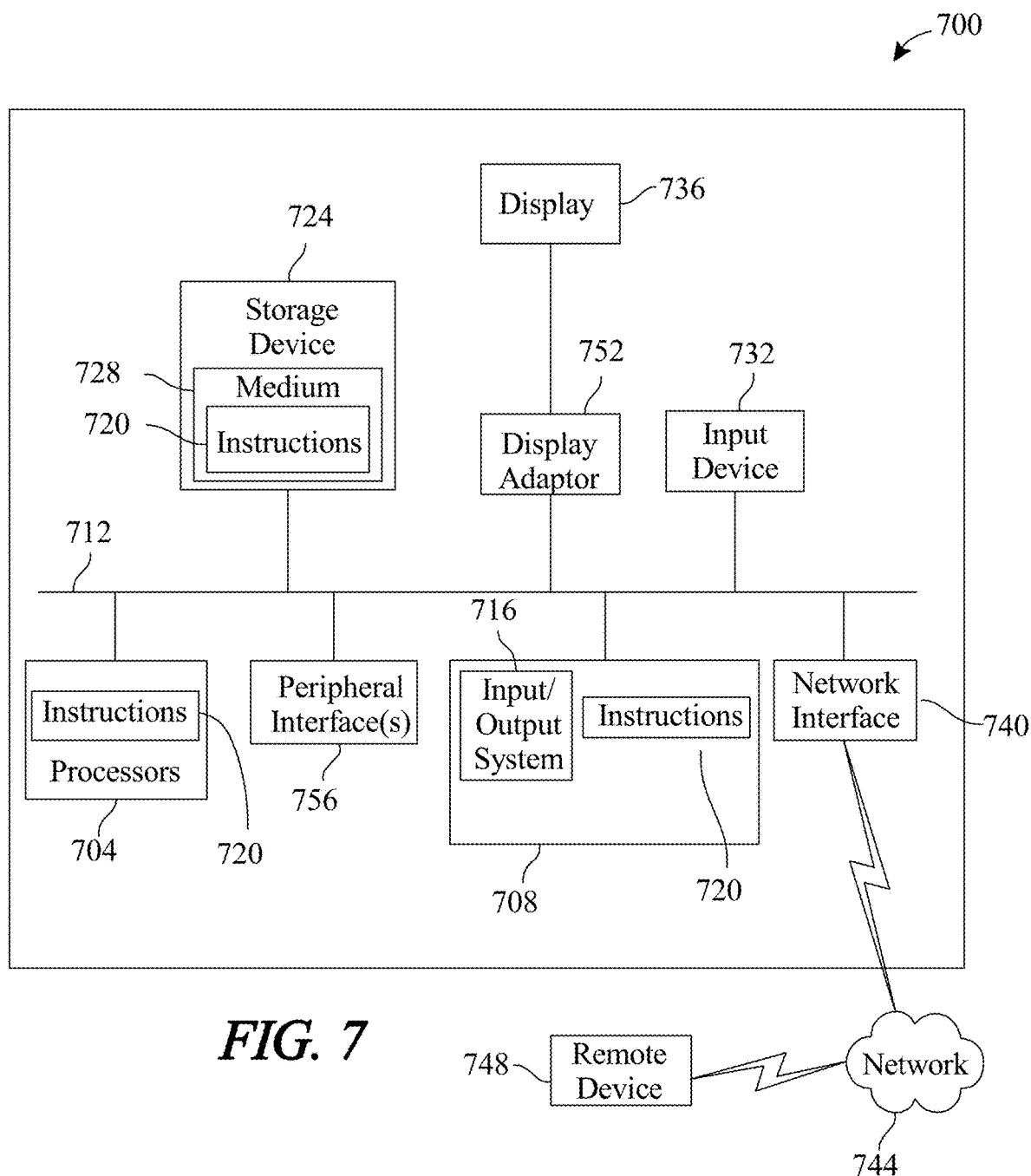
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for scanning vulnerabilities, wherein the apparatus comprises:
    at least a processor; and
    a memory communicatively connected to the at least a processor, the memory containing instructions configuring the at least a processor to:
        access at least a manifest file, wherein the at least a manifest file comprises at least a direct dependency;
        scan the manifest file for software package data;
        extract the software package data from the manifest file, wherein the software package data comprises a plurality of software package vulnerabilities, wherein the plurality of software package vulnerabilities comprises at least a memory safety violation;
        generate at least a dependency tree as a function of the software package data; and
        store the at least a dependency tree in a database, wherein the storing further comprises storing a software vulnerability count.

2. The apparatus of claim 1, wherein the direct dependency comprises a transitive dependency.

3. The apparatus of claim 2, wherein extracting the software package data comprises:
    iterating the transitive dependency; wherein iterating the transitive dependency further comprises:
        accessing a current software package data from a current transitive dependency;
        obtaining a software package detail from the current software package data; and
        adding the software package detail to a software package dictionary.

4. The apparatus of claim 1, wherein the manifest file further comprises a software package identifier, wherein the software package identifier comprises a correlated software package version number.

5. The apparatus of claim 1, wherein extracting the software package data further comprises using a multi-threaded algorithm.

6. The apparatus of claim 1, wherein the dependency tree comprises a dictionary of lists representation.

7. The apparatus of claim 1, wherein the dependency tree further comprises a software package relationship.

8. The apparatus system of claim 1, wherein generating the dependency tree further comprises:
    flagging the software package data, wherein the software package data comprises at least a software package vulnerability.

9. The apparatus of claim 1, wherein generating the dependency tree further comprises:
    identifying a repeated node within the dependency tree; and
    terminating the generation of the dependency tree as a function of the repeated node.

10. A method for scanning vulnerabilities, wherein the method comprises:
    accessing, using at least a processor, at least a manifest file, wherein the at least a manifest file comprises at least a direct dependency;
    scanning, using the at least a processor, the manifest file for a software package data;
    extracting, using the at least a processor, the software package data from the manifest file, wherein the software package data comprises a plurality of software package vulnerabilities, wherein the software package vulnerabilities comprises at least a memory safety violation;

generating, using the at least a processor, at least a dependency tree as a function of the software package data; and storing, by the at least a processor, the at least a dependency tree in a database, wherein the storing further comprises storing a software vulnerability count.

11. The method of claim 10, wherein the direct dependency comprises a transitive dependency.

12. The method of claim 11, wherein extracting the software package data comprises:

iterating the transitive dependency; wherein iterating the transitive dependency further comprises:

accessing a current software package data from a current transitive dependency;

obtaining a software package detail from the current software package data; and adding the software package detail to a software package dictionary.

13. The method of claim 10, wherein the manifest file further comprises a software package identifier, wherein the software package identifier comprises a correlated software package version number.

14. The method of claim 10, wherein extracting the software package data further comprises using a multi-threaded algorithm.

15. The method of claim 10, wherein the dependency tree comprises a dictionary of lists representation.

16. The method of claim 10, wherein the dependency tree further comprises a software package relationship.

17. The method of claim 10, wherein generating the dependency tree further comprises:

Flagging the software package data, wherein the software package comprises at least a software package vulnerability.

18. The method of claim 10, wherein generating the dependency tree further comprises:

identifying a repeated node within the dependency tree; and terminating the generation of the dependency tree as a function of the repeated node.

\* \* \* \* \*